July 21, 1936. J. M. BIERER Re. 20,037
METHOD OF AND APPARATUS FOR VULCANIZING RUBBER ARTICLES
Original Filed March 21, 1933
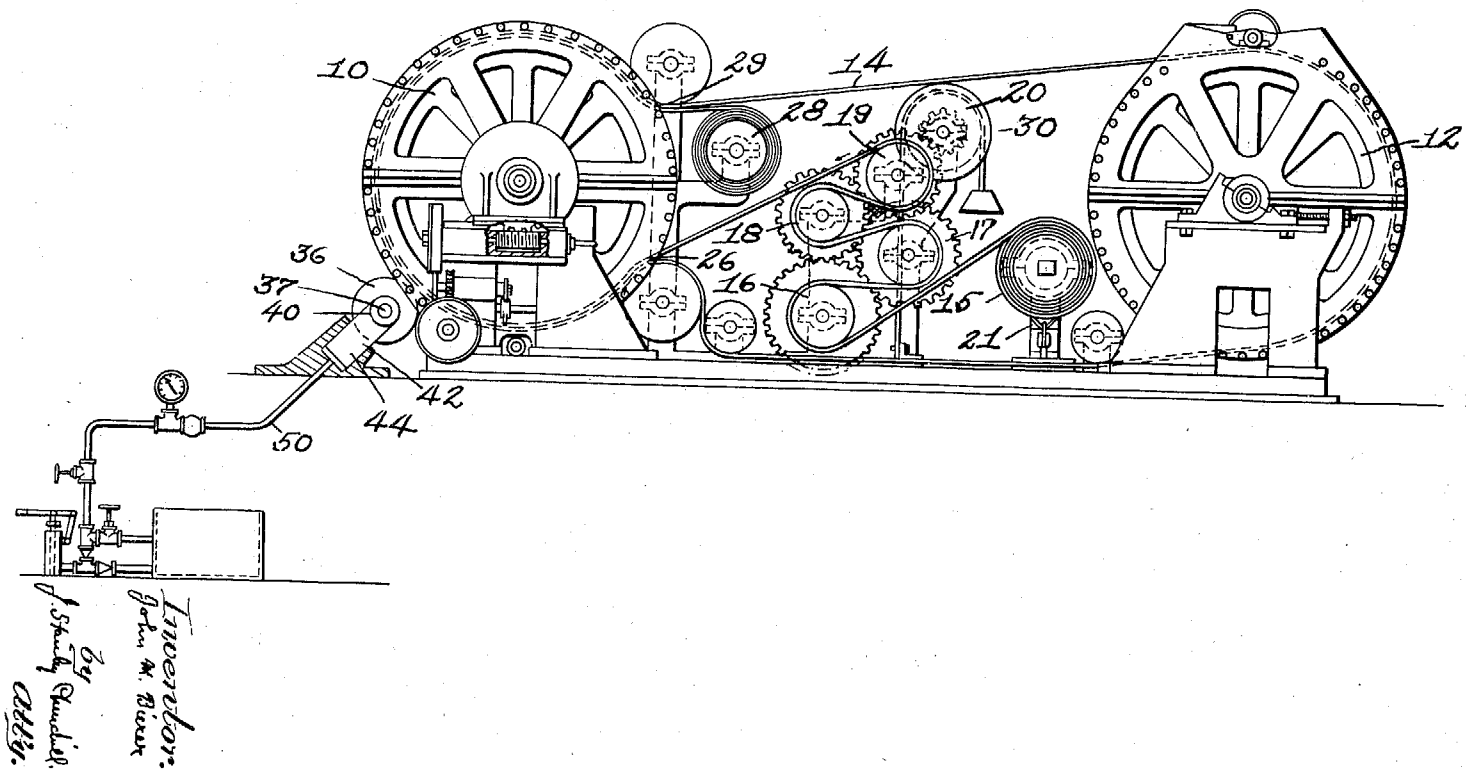

Reissued July 21, 1936

Re. 20,037

UNITED STATES PATENT OFFICE 20,037

METHOD OF AND APPARATUS FOR VULCANIZING RUBBER ARTICLES

John M. Bierer, Waban, Mass., assignor to Boston Woven Hose and Rubber Company, Cambridge, Mass., a corporation of Massachusetts Original No. 1,987,890, dated January 15, 1935, Serial No. 661,879, March 21, 1933. Application for reissue June 2, 1936, Serial No. 83,106

7 Claims. (Cl. 18—6)

This invention relates to apparatus for vulcanizing rubber products such as belting, packing, flooring, and piece or strip goods of various character. It includes within its scope a novel method for vulcanizing such products.

The invention is herein shown as embodied in a vulcanizing machine of the continuous band type. In these machines a tension band is conducted about the circumference of a heated drum or cylinder and the product to be vulcanized is introduced between the tension band and the cylinder, the vulcanizing pressure being derived from the tension of the band. In machines of this type, it is important to flatten or otherwise mold the unvulcanized rubber after it has become heated and thereby rendered plastic early in its passage about the circumference of the cylinder and prior to the vulcanizing thereof which alters the plastic state of the material. It is difficult to secure sufficient molding pressure between the tension belt and the cylinder early in the path of engagement of these two elements because the tension of the band is in a direction more or less tangential to the circumference of the cylinder. With these conditions in view, an important feature of my invention consists in the provision of a pressure roll arranged to bear against the tension band and press it firmly toward the cylinder in a location such as to subject the material to molding pressure after it has traveled a relatively short distance in contact with the circumference of the cylinder and has thereby had an opportunity to become heated and rendered plastic.

Important advantages incident to the construction of my invention are that it eliminates excessively high tension band stresses and the high bearing pressures which such tension has heretofore necessitated. Also, it provides a machine capable of producing a superior vulcanized product and having a capacity for the production of special vulcanized articles which formerly could not be manufactured by continuous process methods. Incidentally, a machine constructed in accordance with my invention may be reduced in weight and supplied at less cost than those in which only the tension of the band has been relied upon to supply the desired vulcanizing pressure.

In the manufacture of rubber belting, for example, it has been found possible to compress the unvulcanized and partially softened belting material by the application of a relatively high compressive force for a short period of time and thus to densify the material and reduce it to the desired thickness. Thereafter, a reduced degree of pressure is effective substantially to hold the material in such condition and this may be readily supplied by a tension band, particularly in passing about that part of the circumference of the drum which is disposed more or less at right angles to the direction of the tension in the band.

These and other features of the invention will be best understood and appreciated from the following description of a preferred embodiment thereof, selected for purposes of illustration and shown in the accompanying drawing, in which The figure is a view in side elevation, partly in section, of the complete apparatus.

In the preferred form of apparatus embodying the present invention, the article to be vulcanized is passed around a heated drum or cylinder and provision is made for maintaining a moderate pressure upon the article during the initial portion of its movement until the article has become softened or rendered plastic to some extent by heat from the cylinder. Provision is then made for subjecting the article to a relatively high pressure sufficient to mold it or compress it into a predetermined condition to permit proper vulcanization, and for thereafter moving the article in contact with the drum while subjecting it to a reduced pressure by which the article may be maintained in its predetermined molded condition until vulcanization is complete.

Referring now to the drawing wherein I have illustrated the preferred embodiment of the present invention, the machine in its general features of construction and mode of operation may be substantially that shown in the United States patent to Midgley, No. 1,445,533, dated February 13, 1923, and in which 10 and 12 represent two rotatable drums over the peripheries of which an endless flexible tension band or belt 14 is arranged to run and which is deflected toward the periphery of the drum by suitable idle rollers to lengthen its arc of contact with the drum. The belt 14 may be tensioned by mechanism for moving the drums apart, as set forth in said Midgley patent.

The rubber belting or other product to be vulcanized is fed from a let-off reel 15 around the tensioning rolls 16, 17, 18 and 19 and then between the surface of the heated drum 10 and the metal tension band 14 and is vulcanized under the pressure of the band 14 during its passage around the periphery of the drum. After leaving the drum the belting is wound upon a suitable reel 28.

The machine herein shown is equipped with mechanism by which an initial tension may be imparted to the belting as it is delivered to the drum. This mechanism is not herein claimed but forms the subject matter of Reissue Patent No. 19,660. The mechanism is indicated by reference character 30 and includes tensioning rolls 16, 17, 18 and 19 which are geared together and retarded in their rotation as a unit, by a friction sheave 20. The movement of the let-off reel 15 is retarded by a brake 21. With this arrangement, the relatively low tension under which the belting leaves the let-off reel and which is necessary for satisfactory operation of the let-off control may be built up to the required high vulcanizing tension at the point where the belting contacts with the vulcanizing drum.

As above stated, continuous vulcanizing apparatus has heretofore been employed comprising two rotatable heating drums with a flexible tension band encircling their peripheries and the vulcanizable article is vulcanized by passing it around the surface of one of the drums and maintaining it in contact with said surface by the flexible band. The pressure applied during the vulcanization has heretofore depended solely upon the tension set up in the band, usually obtained by movement of the heating drums apart. The tension bands for this purpose may be made from various types of fabrics, steel bands, steel cables, or any preferred type of construction adapted to the purpose. The chief disadvantage of the above mentioned type of vulcanizing apparatus, however, is the impossibility of obtaining tension bands of sufficient strength to withstand the high tensions necessary in order to establish relatively heavy pressures on the articles being vulcanized, particularly where large vulcanizing drums are used, a condition obviously due to the fact that the pressure intensity P per square inch of drum surface is dependent upon the tension belt stresses in accordance with the following relationship:—

$$P=\frac{2T}{D}$$

Where T=tension per 1'' width of tension band;
D=drum diameter in inches.

In accordance with the present invention, the disadvantages above mentioned may be avoided by the application to the belting or other article being vulcanized of a relatively high compressive force which may, as herein shown, be applied by one or more compression rolls 36. In the apparatus illustrated, the vulcanizable rubber article such as the belting shown, passes from the let-off reel 15 around the tensioning rolls 16, 17, 18 and 19 onto the drum at and directly into the bite of the drum 10 at the point 26. The belting then passes between the metal tension band and the surface of the heated drum from the entrance point 26 to a point of discharge 29, and during the initial portion of its contact with the drum, it is heated to a comparatively plastic condition by the heat of the drum 10. It has been found that belting or other vulcanizable material, when thus rendered plastic and compressed or molded into a predetermined condition by the application of a relatively high pressure for a relatively short period of time, may be maintained in that condition by employing a moderate amount of tension in the usual tension band 14 of a continuous vulcanizing machine. In other words, after the belting or other article has been compressed to a predetermined desired density and thickness, then less pressure is required to be exerted by the tension band in order to maintain it in such condition than would be required initially so to compress the beltng by means of the band. Accordingly in the continuous vulcanizing apparatus, a compressing roll 36 is arranged to be pressed against the tension band with sufficient pressure to compress or mold the belting to a predetermined density and thickness. The compression roll 36 may be pressed against the tension band to compress the belting beneath it to any desired degree. The roll 36 is provided with journals 37, which are received in the bearings 40, located in piston members 42, of hydraulic cylinders 44. The hydraulic cylinders are connected by the pipe line 50 with any suitable source of hydraulic pressure or with suitable hydraulic pressure equipment for exerting high pressure on the pistons 42. While it is preferred to use hydraulic equipment as described in order that equal pressure may be applied to both ends of the compression roll or rolls, it will be apparent that other types of pressure application may be used.

From the description thus far it will be seen that the belting or other vulcanizable article, after being heated to a relatively plastic condition during the initial portion of its passage around and in contact with the drum 10, and preferably between the drum and tension band surfaces as illustrated in the drawing, is compressed to a predetermined condition by the use of the compression roll 36 which functions to apply high pressure only to a very limited surface of the drum. During the remainder of the travel of the article around the surface of the heated drum it is maintained substantially in such compressed condition by a moderate tension in the tension band 14 until vulcanization of the article is completed, thus reducing the stresses on the tension band and avoiding excessive bearing pressures.

The invention also permits a great reduction in the weight and cost of the mechanical construction of the vulcanizing apparatus as well as eliminating time lost and interrupted operation due to breaking of tension bands under excessive tension band pressures. In addition, the invention permits the employment of large pressure intensities, far in excess of those obtainable solely through the action of a tension band, thus allowing production of special articles which require such high pressure intensities that they could not be successfully manufactured by the continuous vulcanizing machines of the prior art.

While the preferred embodiment of the present invention has been herein illustrated and described, it will be understood that the invention may be embodied in other forms within the scope of the following claims.

Having thus described my invention what I claim as new and desire to secure by Letters Patent of the United States is:

1. A machine for vulcanizing strip material, including a heated cylinder, a tension band movable with the cylinder about a portion of its circumference, and a pressure roll mounted to engage the band opposite to the cylinder at a point appreciably in the rear of that at which the band meets the cylinder, thereby subjecting to severe pressure material which has already been rendered plastic by a limited movement between the band and cylinder.

2. A machine for vulcanizing strip material, including a heated cylinder, a tension band movable with the cylinder about a portion of its circumference, means for guiding unvulcanized strip material onto the cylinder, and a pressure roll mounted to engage the band at an appreciable distance beyond the point at which the material first encounters the cylinder to force the band toward the surface of the cylinder and subject to severe local pressure material which has already been rendered plastic by contact with the heated cylinder.

3. A machine for vulcanizing strip material, including a heated cylinder, a tension band movable with the cylinder about a portion of its circumference, means for guiding unvulcanized strip material onto the cylinder, a pressure roll mounted for movement toward the surface of the cylinder at a substantial distance beyond the point at which the unvulcanized material first encounters the cylinder, and fluid pressure means for forcing the roll against the band to subject to local pressure material which has already been rendered plastic by contact with the heated cylinder.

4. A machine for vulcanizing sheet material including a heated, power-driven cylinder, a longitudinally-tensioned band movable with the cylinder, a roll for deflecting the band about a portion of the circumference of the cylinder and determining the point of bite, and a pressure roll arranged to engage the band at a point substantially beyond said deflecting roll to force the band toward the cylinder and thus subject to severe local pressure material which has already been rendered plastic by movement in contact with the heated cylinder about that portion of its circumference included between the deflecting roll and said pressure roll.

5. A machine for vulcanizing strip material, including a heated vulcanizing cylinder, a tension band extending about a portion of the circumference of the cylinder and arranged to travel with the cylinder in superposed relation upon strip material passing about and in contact with the cylinder, a pressure roll mounted to engage the outer surface of the band opposite to the cylinder and exert a severe local pressure thereon, and means for feeding the strip material onto the cylinder at a point sufficiently in advance of said roll to preheat the material to a more plastic condition by its contact with the cylinder during its passage from said point to the roll.

6. The method of continuously vulcanizing strip material, which is characterized by the steps of conducting the material along a segmental path between moving pressure-applying surfaces, one of which is flexible, heating the material throughout said path, and applying a severe local pressure to the material through the medium of said flexible surface after it has been advanced between the two surfaces sufficiently to be rendered plastic, and thereafter maintaining a lesser degree of pressure upon the material during the remainder of its travel in its segmental path.

7. The method of continuously vulcanizing strip material, which is characterized by the steps of continuously conducting the material along a segmental path in contact with a heated vulcanizing surface and between such surface and a flexible pressure applying surface, applying a severe local pressure to the material through the medium of said flexible surface after sufficient introductory contact of the material with said heated vulcanizing surface to render the material more plastic, and thereafter maintaining sufficient pressure of said surfaces upon the material during the remainder of its travel in said segmental path substantially to retain the compressed condition thereof.

JOHN M. BIERER.